(12) United States Patent
Labbe et al.

(10) Patent No.: US 10,968,834 B2
(45) Date of Patent: Apr. 6, 2021

(54) SHAFT ASSEMBLY FOR AIRCRAFT ENGINE

(71) Applicant: PRATT & WHITNEY CANADA CORP., Longueuil (CA)

(72) Inventors: Michel Labbe, Montreal (CA); Lukasz Pokrzywa, Trzsbownisko (PL)

(73) Assignee: PRATT & WHITNEY CANADA CORP., Longueuil (CA)

( * ) Notice: Subject to any disclaimer, the term of this patent is extended or adjusted under 35 U.S.C. 154(b) by 16 days.

(21) Appl. No.: 16/456,573

(22) Filed: Jun. 28, 2019

(65) Prior Publication Data

US 2020/0408151 A1 Dec. 31, 2020

(51) Int. Cl.
| | | |
|---|---|---|
| *F02C 7/32* | (2006.01) | |
| *F02C 7/36* | (2006.01) | |
| *F16D 3/06* | (2006.01) | |
| *F16D 3/70* | (2006.01) | |
| *F16D 3/84* | (2006.01) | |
| *F16D 3/76* | (2006.01) | |

(52) U.S. Cl.
CPC .................. *F02C 7/36* (2013.01); *F16D 3/06* (2013.01); *F16D 3/76* (2013.01); *F16D 3/848* (2013.01)

(58) Field of Classification Search
CPC ...... F02C 7/32; F02C 7/36; F16D 3/06; F16D 3/76; F16D 3/848
See application file for complete search history.

(56) References Cited

U.S. PATENT DOCUMENTS

| | | | | |
|---|---|---|---|---|
| 3,269,118 | A | | 8/1966 | Benedict et al. |
| 3,686,895 | A | | 8/1972 | Easley |
| 3,799,476 | A | * | 3/1974 | Bouiller ................. B64D 41/00 244/60 |
| 4,598,600 | A | * | 7/1986 | Knowles ............... F01D 25/162 60/798 |
| 5,195,401 | A | * | 3/1993 | Mouton .................... F02C 7/32 60/788 |
| 7,574,854 | B2 | * | 8/2009 | Moniz ................. F16C 33/6677 60/39.08 |
| 9,771,968 | B2 | * | 9/2017 | Duchatelle .............. F01D 9/065 |
| 9,850,820 | B2 | * | 12/2017 | Pettinotti .............. F01D 25/164 |
| 2012/0057967 | A1 | * | 3/2012 | Laurello ................. F01D 5/081 415/178 |
| 2016/0201801 | A1 | | 7/2016 | Harral |
| 2020/0116081 | A1 | * | 4/2020 | Levisse ..................... F02C 7/36 |

\* cited by examiner

*Primary Examiner* — Igor Kershteyn
(74) *Attorney, Agent, or Firm* — Norton Rose Fulbright Canada LLP

(57) ABSTRACT

There is disclosed an aircraft engine having: an engine shaft; a first transmission shaft in driving engagement with the engine shaft and a second transmission shaft concentric with the first transmission shaft and in driving engagement with the first transmission shaft, the second transmission shaft drivingly engageable to an engine accessory, the first and second transmission shafts rotatable about an axis; and at least two axially spaced apart annular ring seals disposed radially between the first and second transmission shafts, the at least two annular ring seals biased against both of the first and second transmission shafts.

20 Claims, 4 Drawing Sheets

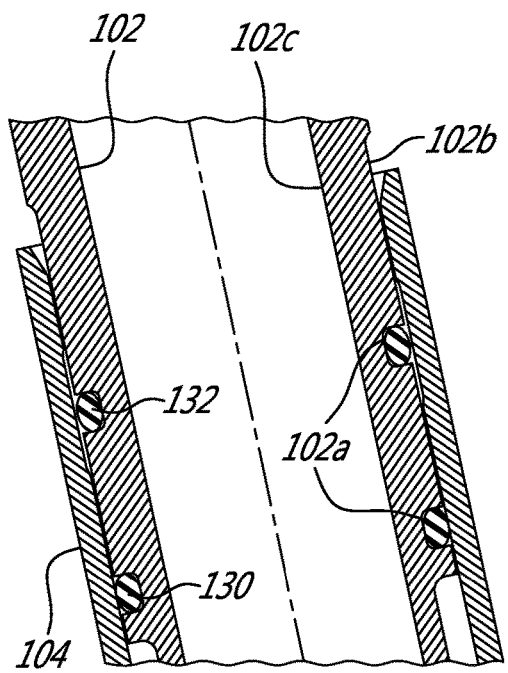
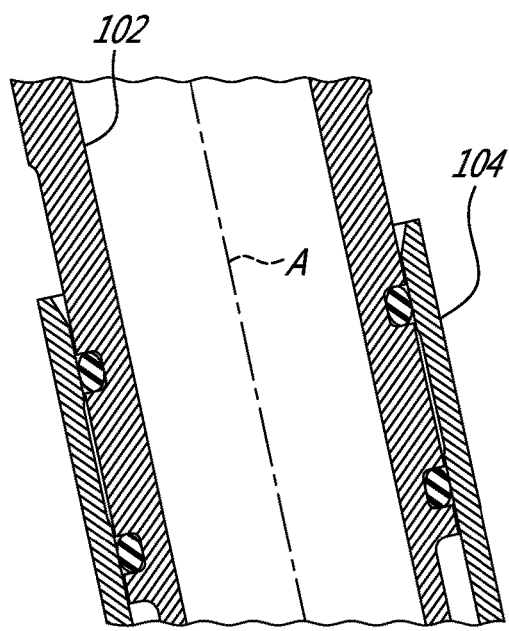
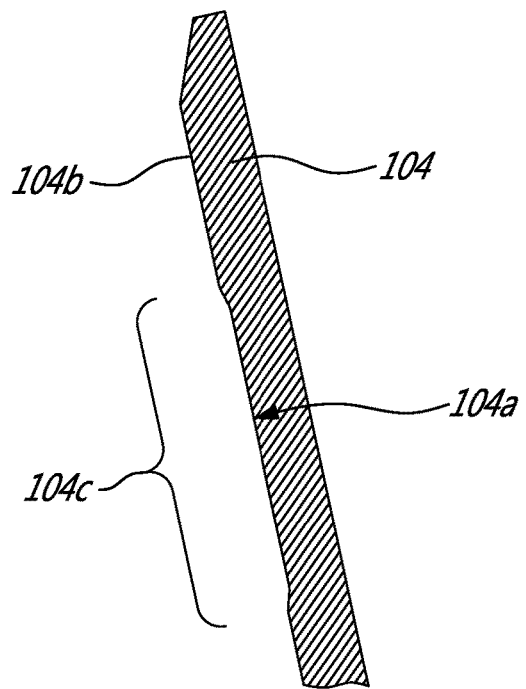

SHAFT ASSEMBLY FOR AIRCRAFT ENGINE

TECHNICAL FIELD

The application relates generally to gas turbine engines and, more particularly, to systems and methods for operating an engine accessory of such engines.

BACKGROUND OF THE ART

A gas turbine engine is configured to drive a main rotatable load, such as a propeller or a fan. In some cases, the gas turbine engine further drives an accessory, such as a gearbox. A shaft is used for coupling a shaft of the gas turbine engine to an accessory gearbox of the gas turbine engine.

SUMMARY

In one aspect, there is provided an aircraft engine comprising: an engine shaft; a first transmission shaft in driving engagement with the engine shaft and a second transmission shaft concentric with the first transmission shaft and in driving engagement with the first transmission shaft, the second transmission shaft drivingly engageable to an engine accessory, the first and second transmission shafts rotatable about an axis; and at least two axially spaced apart annular ring seals disposed radially between the first and second transmission shafts, the at least two annular ring seals biased against both of the first and second transmission shafts.

In another aspect, there is provided a method of retaining a tower shaft and a quill shaft to one another comprising: transmitting a rotational input from an engine shaft of an aircraft engine to an engine accessory with a tower shaft and a quill shaft engaged to the tower shaft; sealing a connection between the quill shaft and the tower shaft with a first annular ring seal disposed between the quill shaft and the tower shaft; and upon removal of the engine accessory from the aircraft engine, retaining the quill shaft in engagement with the tower shaft with both the first annular ring seal and a second annular ring seal disposed between the quill shaft and the tower shaft and axially offset from the first annular ring seal.

In yet another aspect, there is provided a shaft assembly for an aircraft engine, comprising: a tower shaft drivingly engageable to an engine shaft of the aircraft engine; a quill shaft in driving engagement with the tower shaft and drivingly engageable to an engine accessory, the tower shaft concentrically partially received within the quill shaft; and at least two axially spaced apart annular ring seals disposed radially between the quill shaft and the tower shaft, the at least two annular ring seals biased against both of the tower shaft and the quill shaft.

DESCRIPTION OF THE DRAWINGS

Reference is now made to the accompanying figures in which:

FIG. 5 is a schematic cross-sectional view of a connection between a quill shaft and a tower shaft of the shaft assembly of FIG. 2 shown in a first position;

FIG. 6 is a schematic cross-sectional view of the connection between the quill shaft and the tower shaft of the shaft assembly of FIG. 2 shown in a second position; and FIG. 7 is a schematic cross-sectional view of a portion of the quill shaft of the shaft assembly of FIG. 2.

DETAILED DESCRIPTION

Figure 1:
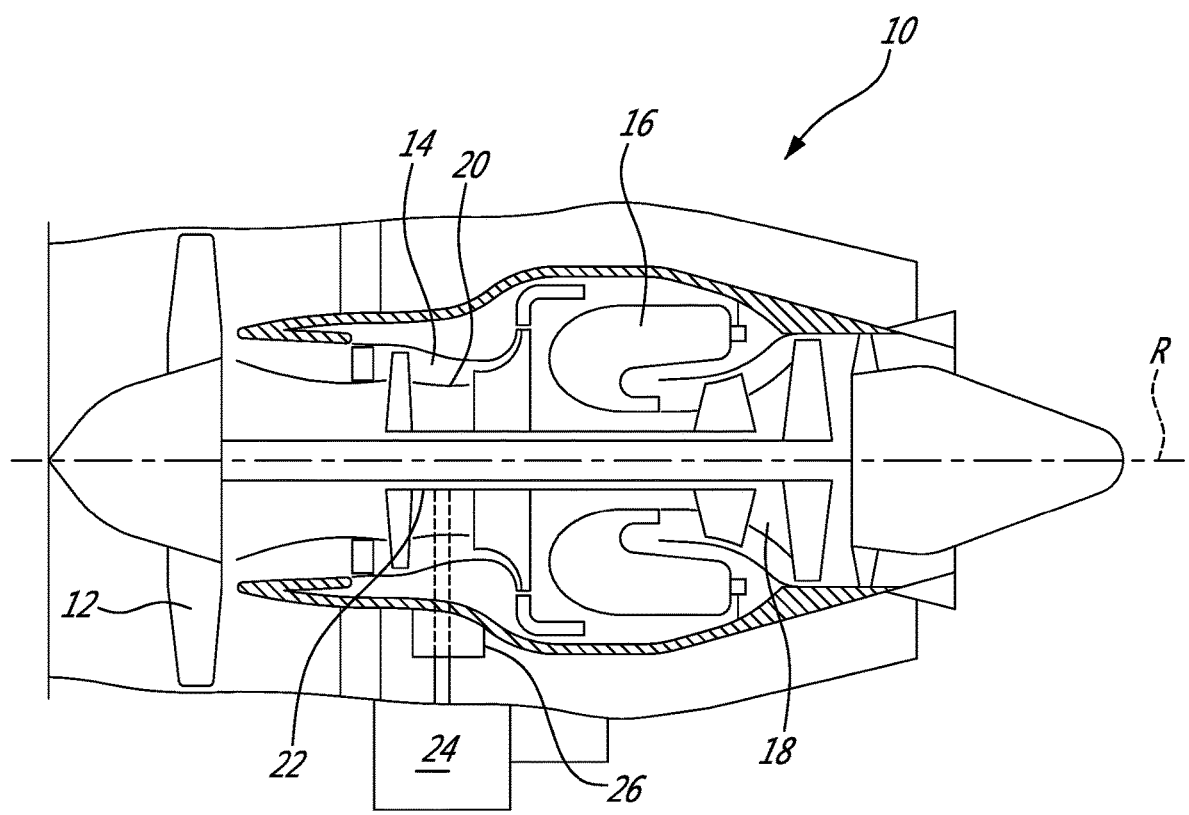
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. It is understood that other kind of engines, such as intermittent internal combustion engine (e.g., rotary engine, piston engine) may alternatively be used.

The gas turbine engine includes an intermediate case 20; the compressor section 14, the combustor 16, and the turbine section 18 being located radially inwardly of the intermediate case 20 relative to a rotation axis R of a shaft 22 of the gas turbine engine 10. The shaft 22 may be part of the low pressure spool.

In some cases, the gas turbine engine 10 may be used to further drive a rotatable load different than the fan 12. For instance, the gas turbine engine 10 may drive an engine accessory 24. In some cases, a rotational speed of the shaft 22 or other shaft is inadequate for the accessory 24. In such cases, a reduction mechanism 26, such as a gearbox, may be used. The accessory 24 is in driving engagement with the gearbox 26. In the embodiment shown, the gearbox 26 is secured to the intermediate case 20 or other structural part of the gas turbine engine 10. Other configurations are contemplated. The accessory 24 may be, for instance, a gearbox, a generator, a pump, and/or a load compressor.

Figure 2:
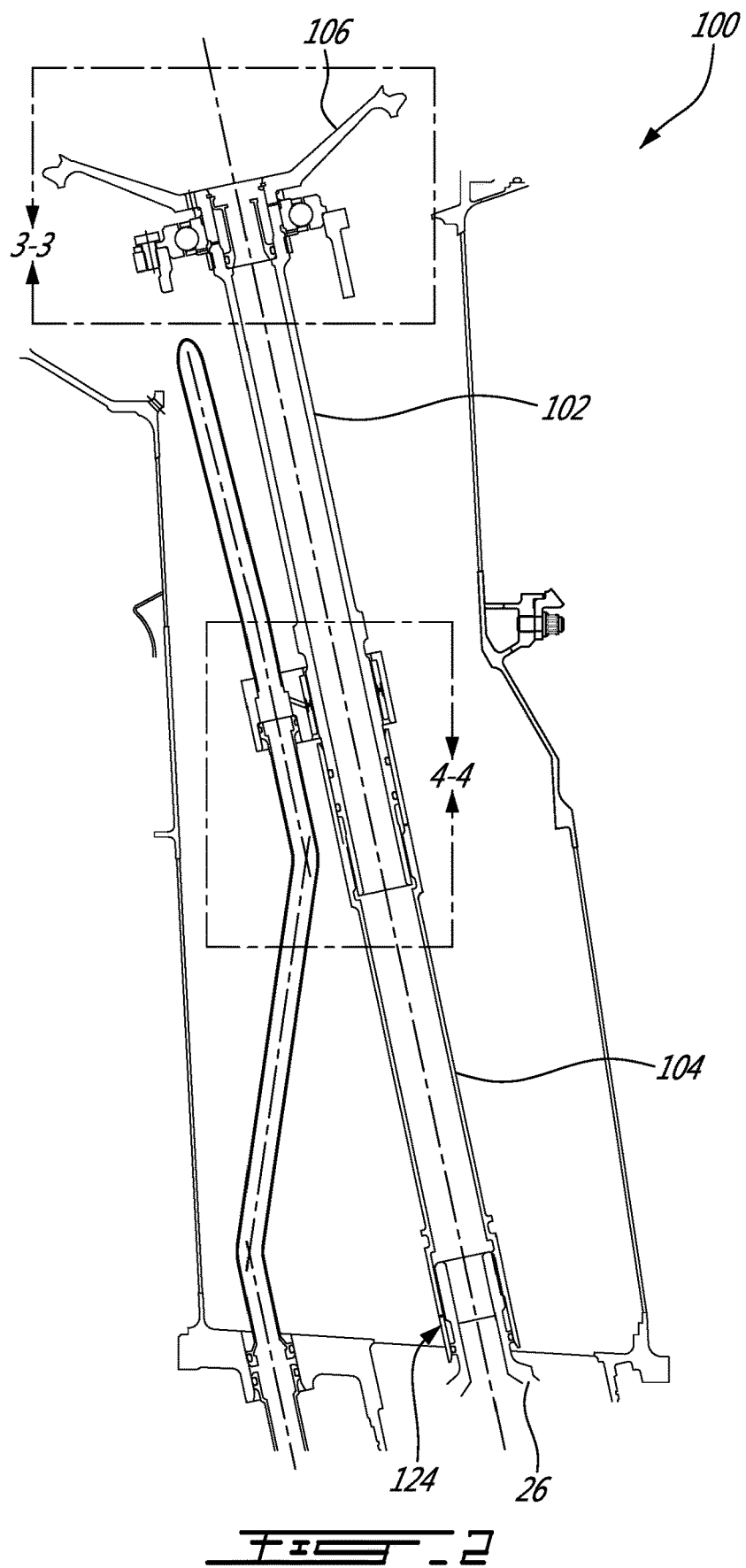
FIG. 2 is a schematic partially transparent three-dimensional view of a shaft assembly of the gas turbine engine of FIG. 1.

Referring to FIG. 2, a shaft assembly used for drivingly engaging the shaft 22 of the gas turbine engine 10 to the gearbox 26 is generally shown at 100. The shaft assembly 100 includes a tower shaft 102 and a quill shaft 104. The tower shaft 102 is in driving engagement with a shaft of the engine 10, such as the shaft 22. The quill shaft 104 is in driving engagement with the tower shaft 102 and is drivingly engaged to an input of the gearbox 26. In the depicted embodiment, the tower shaft 102 is concentric with the quill shaft 104. In the embodiment shown, a portion of the tower shaft 102 is received within the quill shaft 104, and the reverse arrangement is also possible. The tower and quill shafts 102, 104 may be both made of steel.

The quill shaft 104 is used to bridge a gap between the tower shaft 102 and the gearbox 26. In some cases, a distance between the engine shaft 20 and the gearbox 26 is such that solely using a long tower shaft to connect engine shaft 20 to the gearbox 26 might be unsuitable for dynamics reasons. That is, a single long tower shaft connecting the engine shaft 20 to the gearbox 26 might create undesired dynamics issues (e.g., vibrations and/or dynamic modes).

Figure 3:
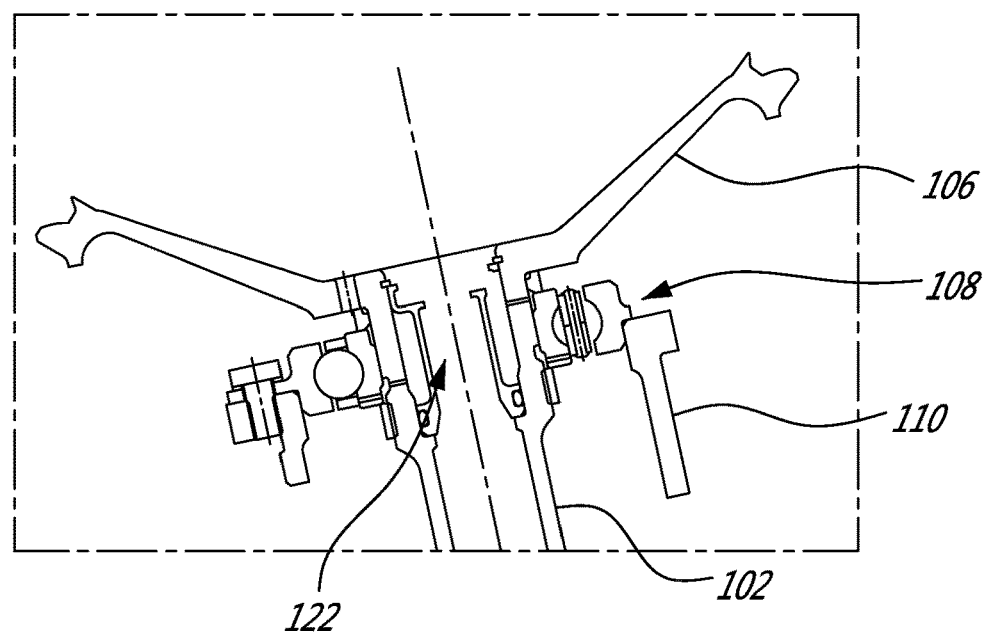
FIG. 3 is a schematic cross-sectional view of zone 3-3 of FIG. 2.

Referring to FIGS. 2-3, the tower shaft 102 is in driving engagement with the shaft 20 of the engine 10 via a gear set that may include, for instance, bevel gear 106; a correspondingly shaped gear being for example connected to or operatively engaged with the engine shaft 20. Any suitable connection (e.g., multiple gears, gear train, spur gears, etc)

between the tower shaft 102 and the shaft 20 of the engine 10 may be used according to the desired coupling and/or reduction. In the embodiment shown, the tower shaft 102 and the bevel gear 106 are monolithic. Alternatively, the tower shaft 102 and the bevel gear 106 may be two distinct pieces that are mechanically connected to one another, such as with a spline coupling.

Referring more particularly to FIG. 3, a bearing 108 is disposed radially between the tower shaft 102 and a support structure 110 of the engine 10. In the embodiment shown, the bearing 108 is a ball bearing, but any suitable type of bearing may be used (e.g., roller bearing, journal bearing). The support structure 110 may be, for instance part of the intermediate case 20 of the engine 10.

Figure 4:
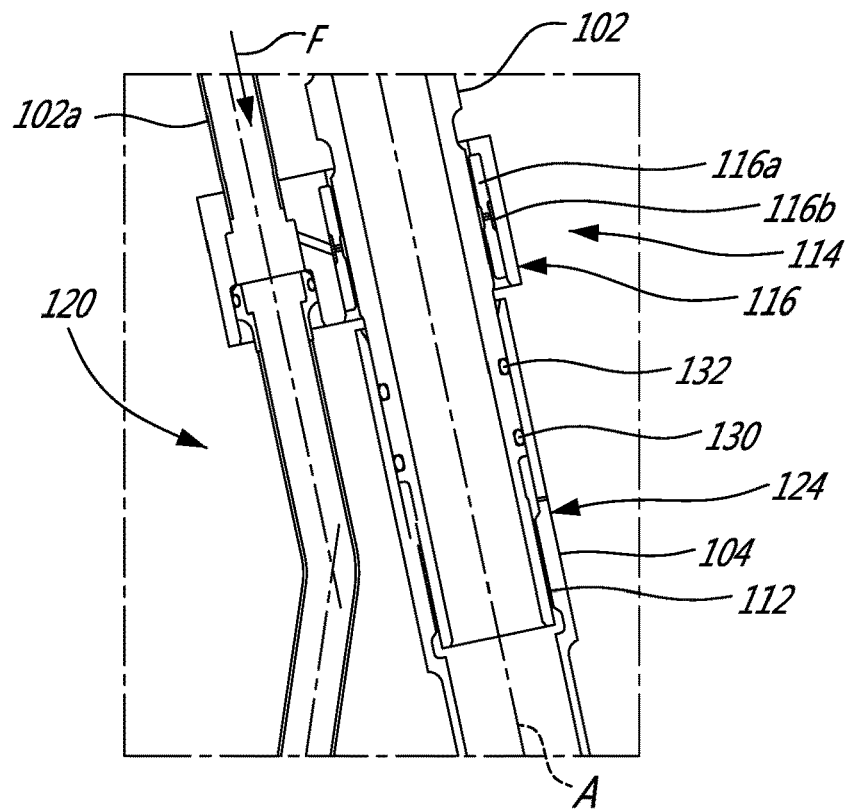
FIG. 4 is a schematic cross-sectional view of zone 4-4 of FIG. 2.

Referring to FIGS. 2 and 4, the tower shaft 102 is mechanically connected to the quill shaft 104 via a spline coupling 112. Any suitable connection may alternatively be used. In the embodiment shown, the quill shaft 104 receives therein the tower shaft 102, i.e., in a mating engagement. Other configurations are contemplated. A structure 114 is used to radially support the shaft assembly 100 relative to an axis of rotation A of the shaft assembly 100. The structure 114 may be connected to the intermediate case 20 of the engine 10.

Referring more particularly to FIG. 4, and in the embodiment shown, a bearing 116 is used for rotatably supporting the tower shaft 102. The bearing 116 may be a journal bearing 116 that includes a sleeve 116a located radially between the structure 114 and the tower shaft 102 relative to the axis A. The sleeve 116a may include a series of apertures 116b for receiving lubricant therein. The apertures 116b may be circumferentially distributed around the rotation axis A. The apertures 116b are fluidly connected to a gap or spacing between the tower shaft 102 and the sleeve 116b for creating a lubricant film therebetween. The lubricant film provides smooth rotation of the tower shaft 102 relative to the structure 114.

The gas turbine engine 10 may include a lubrication system 120 including at least one lubrication conduit 120a that is fluidly connected to a source of lubricant (not shown). The lubrication system 120 is operable to draw a flow of lubricant F from the source of lubricant to the series of apertures 116b defined through the sleeve 116a of the journal bearing 116 to inject lubricant in the gap between the sleeve 116b and the tower shaft 102. In a particular embodiment, an axial scoop (not shown) is used for trapping the lubricant within the tower shaft 102.

The splines lubrication oil is provided by jetting oil into the tower shaft 102. The oil is trapped in the shaft by the mean of an axial oil scoop 122. The oil travels down the shaft to the quill shaft 104. Annular ring seals at both extremities of the quill shaft 104 prevent oil leakage. The oil exits the quill shaft 104 by holes 124. The holes 124 are sized to split the lubrication oil flow in two to ensure proper lubrication of both splines. Space constraint and the insertion depth of the quill shaft 104 into the intermediate case strut were the main design restrictions for the quill shaft retention feature. Still referring to FIG. 4, for limiting lubricant leakage from a radial gap between the quill shaft 104 and the tower shaft 102, a sealing member is provided therebetween. In the embodiment shown, the sealing member is a sealing member, such as an annular ring seal, e.g., an O-ring 130, that is received radially relative to the axis A between the quill shaft 104 and the tower shaft 102.

When the gearbox 26 is installed in the gas turbine engine 10, the quill shaft 104 is supported at its extremities by the tower shaft 102 and by the gearbox 26, respectively. In some cases, it might be desired to remove the gearbox 26 from the gas turbine engine 10, for instance, for maintenance purposes. In such circumstances, as the spline coupling equates to a translational joint, the quill shaft 104 may risk falling by gravity as a result of its own weight during the removal of the gearbox 26.

In the embodiment shown, a retention feature, shown as being an elastomeric seal 132, such as an annular ring seal, e.g., O-ring, is disposed between the tower shaft 102 and the quill shaft 104 and axially spaced apart from the annular seal 130. In a particular embodiment, the frictional force generated by the engagement of the first and second annular ring seals 130, 132 is sufficient to overcome a force generated by the weight of the quill shaft 104 when non-supported by the gearbox 26. In a particular embodiment, only one annular ring seal is used for overcome the force generated by the weight of the quill shaft 104. In a particular embodiment, more than two annular ring seals may be used to overcome the force generated by the weight of the quill shaft 104. In parallel, the annular ring seals 130 and 132 do not contribute substantially to the transmission of the torque between the tower shaft 102 and the quill shaft 104.

Referring now to FIGS. 5-6, the tower shaft 102 and the quill shaft 104 are shown in two different relative positions. In FIG. 5, a baseline position, in which the second annular ring seal 132 is disengaged from the tower shaft 102, is shown and, in FIG. 6, a retention position in which the second annular ring seal 132 retains the quill shaft 104 engaged with the tower shaft 102 is shown.

The tower shaft 102 and the quill shaft 104 are axially movable one relative to the other relative to their axis of rotation A between the baseline position and the retention position. In the embodiment shown, the second annular ring seal 132 comes into contact with both of the tower and quill shafts 102, 104 only in the retention position, i.e., it may sustain an elastic deformation between the tower shaft 102 and the quill shaft 104.

Referring to FIG. 7, the quill shaft 104 defines a step-down diameter portion 104a axially between its extremities. In other words, an inner surface 104b of the quill shaft 104 changes in diameter along a portion 104c of its axial length. In the depicted embodiment, the diameter of the inner surface 104b of the quill shaft 104 increases along the portion 104c of its axial length. As observed, the variation in diameter may be continuous so as not to define straight edges, showing instead frustoconical surface. In such a case, the second annular ring seal 132 is gradually biased against the quill shaft 104 when said quill shaft 104 moves relative to the tower shaft 102.

Referring to FIG. 5, the second annular ring seal 132, when the tower and quill shaft 102, 104 are in the baseline position, is axially aligned with the step-down portion 104a such that the second annular ring seal 132 is radially spaced apart from the inner surface 104 of the quill shaft 104. In other words, in the baseline position, the second annular ring seal is disengaged from the quill shaft 104. In the depicted embodiment, the first annular ring seal 130 is always engaged and in contact with both of the quill shaft 104 and the tower shaft 102.

Herein, "engaged" implies that the annular ring seal is at least in contact with both of the quill and tower shaft 104, 102. In a particular embodiment, "engaged" implies that the annular ring seal is compressed or biased between the tower and quill shafts 102, 104. The annular ring seal need not necessarily be compressed to a limit of its elastic limit for being "engaged" between the shafts 102, 104.

In the embodiment shown, the first and second annular ring seals 130, 132 are received within grooves 102a defined by the tower shaft 102. The grooves 102a extend from an outer surface 102b of the tower shaft 102 to an inner surface 102c thereof. The grooves 102a extend radially from the outer surface 102b of the tower shaft 102 to the inner surface 102c of the tower shaft 102. The two grooves 102a are axially spaced apart from each other relative to the rotation axis A of the tower and quill shafts 102, 104.

It is understood that other configurations are contemplated, notably with the reverse arrangement being contemplated. For instance, the grooves 102a may be defined by the quill shaft 104 instead of by the tower shaft 102; the step-down portion 104a being defined by the tower shaft 102 instead of by the quill shaft 104.

Referring to FIG. 6, when the gearbox 26 is removed, the weight of the quill shaft 104 may translate the quill shaft 104 away from the tower shaft 102 in such a way that the second annular ring seal 132 becomes axially offset form the step-down portion 104a of the tower shaft and becomes engaged and in contact with both of the tower and quill shaft 102, 104. In an embodiment, because of the gradual shape (e.g., frustoconical), there is an increase in the elastic deformation of the annular ring seal 132, and thus an increase in the frictional force due to the compression of the annular ring seal 132. In the position depicted in FIG. 6, both of the first and second annular ring seals 130, 132 contribute in retaining the quill shaft 104 in engagement with the tower shaft 102. In other words, in the position depicted in FIG. 6, both of the first and second annular ring seals 130, 132 may be biased against both of the tower and quill shafts 102, 104.

In a particular embodiment, having the second annular ring seal 132 unbiased against the quill shaft in the baseline position allows for a less rigid connection between the tower and quill shafts 102, 104. More specifically, in the baseline position (under operation) torque is expected to be transmitted between tower shaft and the quill shaft via a flexible spline joint. Since the joint is of the flexible type, under operation, quill shaft and tower shaft axis might not be perfectly concentric. Less rigid connection between the tower shaft and the quill shaft might not restrict their position at operation, and might allow sufficient freedom to cater to the misalignment between the tower and the AGB input pinion, and might allow the torque being transmitted via spline joint rather than by usage of the O-rings or the friction between the tower shaft and the quill shaft surfaces.

For retaining the tower shaft 102 and the quill shaft 104 to one another, a rotational input is transmitted from the engine shaft 22 of the aircraft engine 10 to the engine accessory 24 with the tower shaft 102 and the quill shaft 104 engaged to the tower shaft 102; a connection between the quill shaft 104 and the tower shaft 102 is sealed with the first annular ring seal 130 disposed between the quill shaft 104 and the tower shaft 102; and upon removal of the engine accessory 24 from the aircraft engine 10, the quill shaft 104 is retained in engagement with the tower shaft 102 with both the first annular ring seal 130 and the second annular ring seal 132 disposed between the quill shaft 104 and the tower shaft 102 and axially offset from the first annular ring seal 130.

In the embodiment shown, the axial position of the first annular ring seal 130 and the second annular ring seal 132 is maintained relative to the tower shaft 102. In the depicted embodiment, retaining the quill shaft 104 in engagement with the tower shaft 102 includes axially moving the quill shaft 104 away from the tower shaft 102 from the baseline position in which only the first annular ring seal 130 is engaged to both of the quill shaft 104 and the tower shaft 102 to the retention position in which both of the first annular ring seal 130 and the second annular ring seal 132 are engaged to the quill shaft 104 and the tower shaft 102. In the embodiment shown, the inner surface of the quill shaft 104 defines the step-down diameter portion at the second annular ring seal 132 in the baseline position, a sealing engagement is provided between the tower shaft 102 and the quill shaft 104 solely via the first annular ring seal 130 in the baseline position. In the depicted embodiment, transmitting the rotational input from the engine shaft 22 to the engine accessory 24 via the tower shaft 102 and the quill shaft 104 includes transmitting a rotation of the tower shaft 102 to the quill shaft 104 via the spline coupling 112 between the tower shaft 102 and the quill shaft 104. Herein, transmitting the rotational input from the engine shaft 22 to the engine accessory 24 via the tower shaft 102 and the quill shaft 104 includes radially supporting the tower shaft 102 and the quill shaft 104 proximate to connection between the tower shaft 102 and the quill shaft 104. In the illustrated embodiment, retaining the quill shaft 104 in engagement with the tower shaft 102 with both the first annular ring seal 130 and the second annular ring 132 seal includes increasing a force exerted by the second annular ring seal 132 on both of the quill shaft 104 and the tower shaft 102 while translating the quill shaft 104 relative to the tower shaft 102.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An aircraft engine comprising: an engine shaft; a first transmission shaft in driving engagement with the engine shaft and a second transmission shaft concentric with the first transmission shaft and in driving engagement with the first transmission shaft, the second transmission shaft drivingly engageable to an engine accessory, the first and second transmission shafts rotatable about an axis; and at least two axially spaced apart annular ring seals disposed radially between the first and second transmission shafts, the at least two annular ring seals biased against both of the first and second transmission shafts.

2. The aircraft engine of claim 1, wherein each of the at least two axially spaced apart annular ring seals is received within a respective one of at least two axially spaced apart grooves.

3. The aircraft engine of claim 2, wherein a portion of the first transmission shaft is received within the second transmission shaft, the at least two axially spaced apart grooves extending from an outer surface of the first transmission shaft and toward the axis.

4. The aircraft engine of claim 1, wherein a portion of the first transmission shaft is received within the second transmission shaft, the first and second transmission shafts axially movable one relative to the other between a baseline position in which one of the at least two annular ring seals is disengaged from one of the first and second transmission shafts and a retention position in which both of the at least two annular ring seals are engaged to both of the first and second transmission shafts.

5. The aircraft engine of claim 4, wherein an inner surface of the second transmission shaft defines a step-down diameter portion axially aligned with the one of the at least two annular ring seals in the baseline position.

6. The aircraft engine of claim 1, wherein the first and second transmission shafts are in driving engagement with each other via a spline coupling.

7. The aircraft engine of claim 1, further comprising a bearing rotatably supporting the first transmission shaft proximate a connection between the first and second transmission shaft.

8. The aircraft engine of claim 7, wherein the bearing is a journal bearing.

9. A method of retaining a tower shaft and a quill shaft to one another comprising:
   transmitting a rotational input from an engine shaft of an aircraft engine to an engine accessory with a tower shaft and a quill shaft engaged to the tower shaft;
   sealing a connection between the quill shaft and the tower shaft with a first annular ring seal disposed between the quill shaft and the tower shaft; and
   upon removal of the engine accessory from the aircraft engine, retaining the quill shaft in engagement with the tower shaft with both the first annular ring seal and a second annular ring seal disposed between the quill shaft and the tower shaft and axially offset from the first annular ring seal.

10. The method of claim 9, further comprising maintaining an axial position of the first annular ring seal and the second annular ring seal relative to the tower shaft.

11. The method of claim 9, wherein retaining the quill shaft in engagement with the tower shaft includes axially moving the quill shaft away from the tower shaft from a baseline position in which only the first annular ring seal is engaged to both of the quill shaft and the tower shaft to a retention position in which both of the first annular ring seal and the second annular ring seal are engaged to the quill shaft and the tower shaft.

12. The method of claim 11, wherein an inner surface of the quill shaft defines a step-down diameter portion at the second annular ring seal in the baseline position, the method comprising providing a sealing engagement between the tower shaft and the quill shaft solely via the first annular ring seal in the baseline position.

13. The method of claim 9, wherein transmitting the rotational input from the engine shaft to the engine accessory via the tower shaft and the quill shaft includes transmitting a rotation of the tower shaft to the quill shaft via a spline coupling between the tower shaft and the quill shaft.

14. The method of claim 9, wherein transmitting the rotational input from the engine shaft to the engine accessory via the tower shaft and the quill shaft includes radially supporting the tower shaft and the quill shaft proximate to connection between the tower shaft and the quill shaft.

15. The method of claim 9, wherein retaining the quill shaft in engagement with the tower shaft with both the first annular ring seal and the second annular ring seal includes increasing a force exerted by the second annular ring seal on both of the quill shaft and the tower shaft while translating the quill shaft relative to the tower shaft.

16. A shaft assembly for an aircraft engine, comprising: a tower shaft drivingly engageable to an engine shaft of the aircraft engine; a quill shaft in driving engagement with the tower shaft and drivingly engageable to an engine accessory, the tower shaft concentrically partially received within the quill shaft; and at least two axially spaced apart annular ring seals disposed radially between the quill shaft and the tower shaft, the at least two annular ring seals biased against both of the tower shaft and the quill shaft.

17. The shaft assembly of claim 16, wherein each of the at least two axially spaced apart annular ring seals is received within a respective one of at least two axially spaced apart grooves.

18. The shaft assembly of claim 17, wherein the at least two axially spaced apart grooves extend from an outer surface of the tower shaft and toward an axis of rotation of the shaft assembly.

19. The shaft assembly of claim 16, wherein the tower shaft and the quill shaft are axially movable one relative to the other between a baseline position in which one of the at least two annular ring seals is disengaged from one of the tower shaft and the quill shaft and a retention position in which both of the two annular ring seals are biased against both of the tower shaft and the quill shaft.

20. The shaft assembly of claim 19, wherein an inner surface of the quill shaft defines a step-down diameter portion axially aligned with one of the at least two annular ring seals in the baseline position.

\* \* \* \* \*